US010868473B2

United States Patent
Chang et al.

(10) Patent No.: US 10,868,473 B2
(45) Date of Patent: Dec. 15, 2020

(54) SECONDARY SIDE CONTROLLED CONTROL CIRCUIT FOR POWER CONVERTER WITH SYNCHRONOUS RECTIFIER

(71) Applicant: SEMICONDUCTOR COMPONENTS INDUSTRIES, LLC, Phoenix, AZ (US)

(72) Inventors: Yung-I Chang, Taipei (TW);
Kuo-Hsien Huang, New Taipei (TW);
Chen-Hua Chiu, New Taipei (TW)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 47 days.

(21) Appl. No.: 15/361,997

(22) Filed: Nov. 28, 2016

(65) Prior Publication Data

US 2017/0155335 A1    Jun. 1, 2017

Related U.S. Application Data

(60) Provisional application No. 62/260,857, filed on Nov. 30, 2015.

(51) Int. Cl.
*H02M 3/335* (2006.01)
*H02M 1/08* (2006.01)
*H02M 1/36* (2007.01)
*H02M 1/00* (2006.01)

(52) U.S. Cl.
CPC ......... *H02M 3/33592* (2013.01); *H02M 1/08* (2013.01); *H02M 1/36* (2013.01); *H02M 2001/0009* (2013.01); *Y02B 70/10* (2013.01)

(58) Field of Classification Search
CPC ......... H02M 3/33592; H02M 3/33507; H02M 3/33523; H02M 3/33546; H02M 3/33576; H02M 3/335; H02M 3/1588; H02M 1/08; H02M 1/36; H02M 2001/0009; H02M 2001/0058
See application file for complete search history.

(56) References Cited

U.S. PATENT DOCUMENTS

| | | | |
|---|---|---|---|
| 5,757,627 A * | 5/1998 | Faulk | H02M 1/36 363/21.14 |
| 5,991,171 A | 11/1999 | Cheng | |
| 9,444,357 B1 * | 9/2016 | Matthews | G06F 1/3287 |

(Continued)

OTHER PUBLICATIONS

Office Action dated Jul. 17, 2018 for counterpart Chinese Patent Application No. 201611079432.1, 13 pages.

*Primary Examiner* — Gustavo A Rosario-Benitez
(74) *Attorney, Agent, or Firm* — Robert F. Hightower

(57) ABSTRACT

A secondary side controlled control circuit for power converter with synchronous rectifier is provided. The secondary side controlled control circuit comprises a primary side controller and a secondary side controller. The primary side controller generates a primary side switching signal for switching a primary side switch of the power converter. The secondary side controller generates a secondary side switching signal for switching a switch of the synchronous rectifier of the power converter. The secondary side controller generates a primary side control signal to control the primary side controller for controlling the primary side switching signal.

20 Claims, 8 Drawing Sheets

(56) References Cited

U.S. PATENT DOCUMENTS

| | | | |
|---|---|---|---|
| 2006/0125450 A1* | 6/2006 | Tabaian | H02M 1/08 323/222 |
| 2009/0141521 A1* | 6/2009 | Yang | H02M 3/33592 363/49 |
| 2009/0213623 A1* | 8/2009 | Yang | H02M 3/33507 363/49 |
| 2009/0268494 A1* | 10/2009 | Hu | H02M 1/08 363/89 |
| 2014/0192565 A1* | 7/2014 | Wang | H02M 3/33592 363/21.14 |
| 2014/0192566 A1* | 7/2014 | Yang | H02M 3/33523 363/21.15 |
| 2014/0192575 A1* | 7/2014 | Olivik | H02M 3/33592 363/89 |
| 2014/0247627 A1* | 9/2014 | Louvel | H02M 3/33592 363/21.03 |
| 2015/0103567 A1* | 4/2015 | Wang | H02M 3/33592 363/21.13 |
| 2016/0036340 A1* | 2/2016 | Kikuchi | H02M 1/32 363/21.14 |
| 2016/0079878 A1* | 3/2016 | Lin | H02M 3/33592 363/21.14 |
| 2016/0344296 A1* | 11/2016 | Luo | H02M 3/33523 |
| 2016/0359419 A1* | 12/2016 | Lin | H02M 1/40 |

* cited by examiner

SECONDARY SIDE CONTROLLED CONTROL CIRCUIT FOR POWER CONVERTER WITH SYNCHRONOUS RECTIFIER

CROSS-REFERENCE TO RELATED APPLICATION

This Application claims priority to prior filed Provisional Application Ser. No. 62/260,857, filed 30 Nov. 2015 which is incorporated herein by reference.

BACKGROUND OF THE INVENTION

Field of Invention

The present invention relates to a power converter, and more specifically relates to a secondary side controlled control circuit for controlling the power converter with synchronous rectifier.

Description of the Related Art

The power converters are widely used in a variety of electronic applications for providing power. In general, the most power converters include the synchronous rectifier at the secondary side for improving efficiency of the power converters. The various control circuits for power converters with synchronous rectifier had been developed. However, the conventional control circuits have drawbacks, such as error trigger.

Accordingly, the present invention provides a secondary side controlled control circuit for the power converters with synchronous rectifier.

BRIEF SUMMARY OF THE INVENTION

The objective of the present invention is to provide a secondary side controlled control circuit for controlling the leading edge of the primary side switching signal of the power converter with synchronous rectifier.

A secondary side controlled control circuit for power converter with synchronous rectifier according to the present invention comprises a primary side controller and a secondary side controller. The primary side controller generates a primary side switching signal for switching a primary side switch of the power converter. The secondary side controller generates a secondary side switching signal for switching a switch of the synchronous rectifier of the power converter. The secondary side controller generates a primary side control signal to control the primary side controller for controlling the primary side switching signal.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DETAILED DESCRIPTION OF EMBODIMENTS

Figure 1:
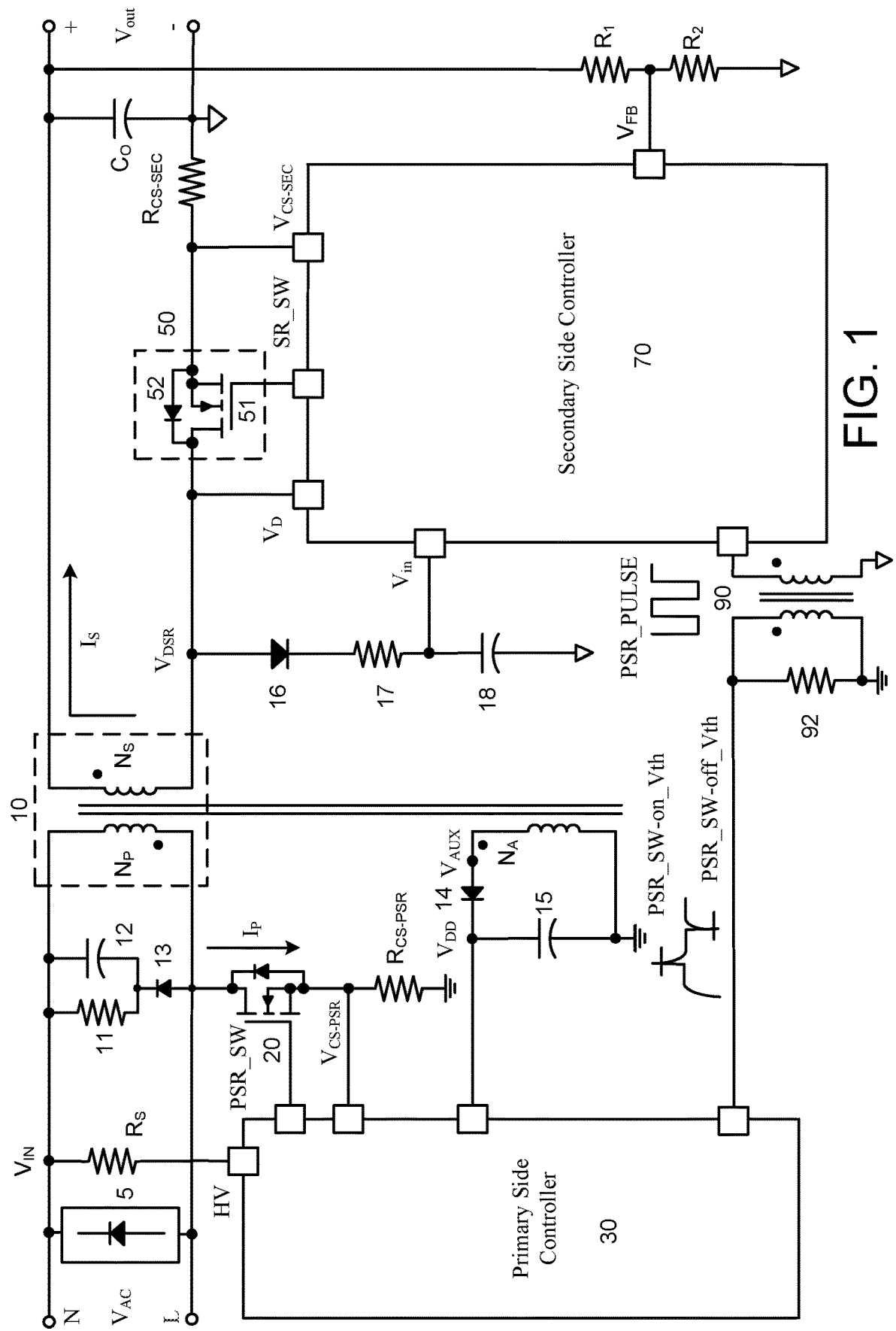
FIG. 1 is a circuit diagram of an embodiment of a power converter in accordance with the present invention.

FIG. 1 is a circuit diagram of an embodiment of a power converter in accordance with the present invention. As shown in FIG. 1, the power converter comprises a rectifier 5 and a transformer 10. The transformer 10 includes a primary winding $N_P$, a secondary winding $N_S$, and an auxiliary winding $N_A$. The rectifier 5 rectifies an AC power $V_{AC}$ to generate an input power for the transformer 10. The input power provides an input voltage $V_{IN}$. The first terminals of a resistor 11 and a capacitor 12 are coupled to the first terminal of the primary winding $N_P$, and the second terminals of the resistor 11 and the capacitor 12 are coupled together. The cathode of a diode 13 is coupled to the second terminals of the resistor 11 and the capacitor 12, and the anode is coupled to the second terminal of the primary winding $N_P$.

The first terminal of a primary side switch 20 is coupled to the second terminal of the primary winding $N_P$ of the transformer 10. A current-sense device $R_{CS\text{-}PSR}$ is coupled between the second terminal of the primary side switch 20 and the ground to sense a primary side current $I_P$ flowing through the primary side switch 20 and generate a primary side current-sense signal $V_{CS\text{-}PSR}$. The primary side switch 20 is coupled to switch the transformer 10 for transforming a power from the primary winding $N_P$ to the secondary winding $N_S$.

A synchronous rectifier (SR) 50 is coupled to the second terminal of the secondary winding $N_S$ for improving the efficiency of power conversion. The synchronous rectifier 50 comprises a switch 51 and its body diode 52. An output capacitor $C_O$ is coupled between the first terminal of the secondary winding $N_S$ and the ground for providing an output voltage $V_{out}$ at the output terminal of the power converter. A current-sense device $R_{CS\text{-}SEC}$ is coupled between the synchronous rectifier 50 and the ground of the secondary side of the transformer 10 to sense a secondary side current $I_S$ of the secondary winding $N_S$ and generate a secondary side current-sense signal $V_{CS\text{-}SEC}$. The secondary side current-sense signal $V_{CS\text{-}SEC}$ represents the secondary side current $I_S$.

A diode 16, a resistor 17 and a capacitor 18 coupled in series are coupled between the second terminal of the secondary winding $N_S$ and the ground to detect a secondary side transformer signal $V_{DSR}$ for generating an input signal $V_{in}$. The secondary side transformer signal $V_{DSR}$ is correlated to the state of a reflected voltage $V_{AUX}$ generated at the auxiliary winding $N_A$ of the transformer 10. The secondary side transformer signal $V_{DSR}$ is inverse to the reflected voltage $V_{AUX}$. The input signal $V_{in}$ represents the state of the input voltage $V_{IN}$. The anode of a diode 14 is coupled to the first terminal of the auxiliary winding $N_A$. An capacitor 15 is coupled between the cathode of the diode 14 and the ground for providing a supply voltage $V_{DD}$.

The control circuit for the power converter having the synchronous rectifier 50 comprises a primary side controller 30 and a secondary side controller 70. The primary side controller 30 is coupled to the primary side of the transformer 10 and generates a primary side switching signal PSR_SW to switch the primary side switch 20 for switching the transformer 10. A start resistor $R_S$ is coupled between the output terminal of the rectifier 5 and the primary side controller 30. The start resistor $R_S$ receives the input voltage $V_{IN}$ to provide a high voltage HV to the primary side controller 30 for startup. The primary side controller 30 is further coupled to the auxiliary winding $N_A$ to receive the supply voltage $V_{DD}$.

The secondary side controller 70 is coupled to the secondary side of the transformer 10 and generates a secondary side switching signal SR_SW to control the synchronous rectifier 50. The secondary side controller 70 is coupled to the second terminal of the secondary winding $N_S$ and a voltage divider including resistors $R_1$ and $R_2$. The voltage divider is coupled to the output terminal of the power converter to divide the output voltage $V_{out}$ for generating a feedback signal $V_{FB}$. Therefore, the feedback signal $V_{FB}$ is correlated to the output voltage $V_{out}$. The secondary side controller 70 controls the secondary side switching signal SR_SW in response to the feedback signal $V_{FB}$ and the secondary side current-sense signal $V_{CS-SEC}$. The secondary side controller 70 further receives the input signal $V_{in}$ for detecting the input voltage $V_{IN}$ of the power converter.

The secondary side controller 70 further generates a primary side control signal to control the primary side controller 30 for controlling the leading edge of the primary side switching signal PSR_SW. That is, the secondary side controller 70 controls the start time of the enabling (leading edge) of the primary side switching signal PSR_SW, and therefore the secondary side controller 70 controls the on-time (duty) of the primary side switching signal PSR_SW. The secondary side controller 70 generates a pulse signal PSR_PULSE in response to the secondary side current-sense signal $V_{CS-SEC}$ and the feedback signal $V_{FB}$ according to an embodiment of the present invention. The pulse signal PSR_PULSE is transferred to the primary side controller 30 via a signal-transfer device 90, such as digital transformer or isolating pulse transformer, coupled between the primary side controller 30 and the secondary side controller 70. The pulse signal PSR_PULSE acts as the primary side control signal. A resistor 92 is coupled to the signal-transfer device 90.

The primary side controller 30 enables the primary side switching signal PSR_SW to turn on the primary side switch 20 when the primary side control signal is enabled, that the level of the pulse signal PSR_PULSE is higher than a enabling threshold PSR_SW-on_Vth. The primary side controller 30 disables the primary side switching signal PSR_SW to turn off the primary side switch 20 when the primary side control signal is disabled, that the level of the pulse signal PSR_PULSE is lower than a disabling threshold PSR_SW-off_Vth.

Figure 2:
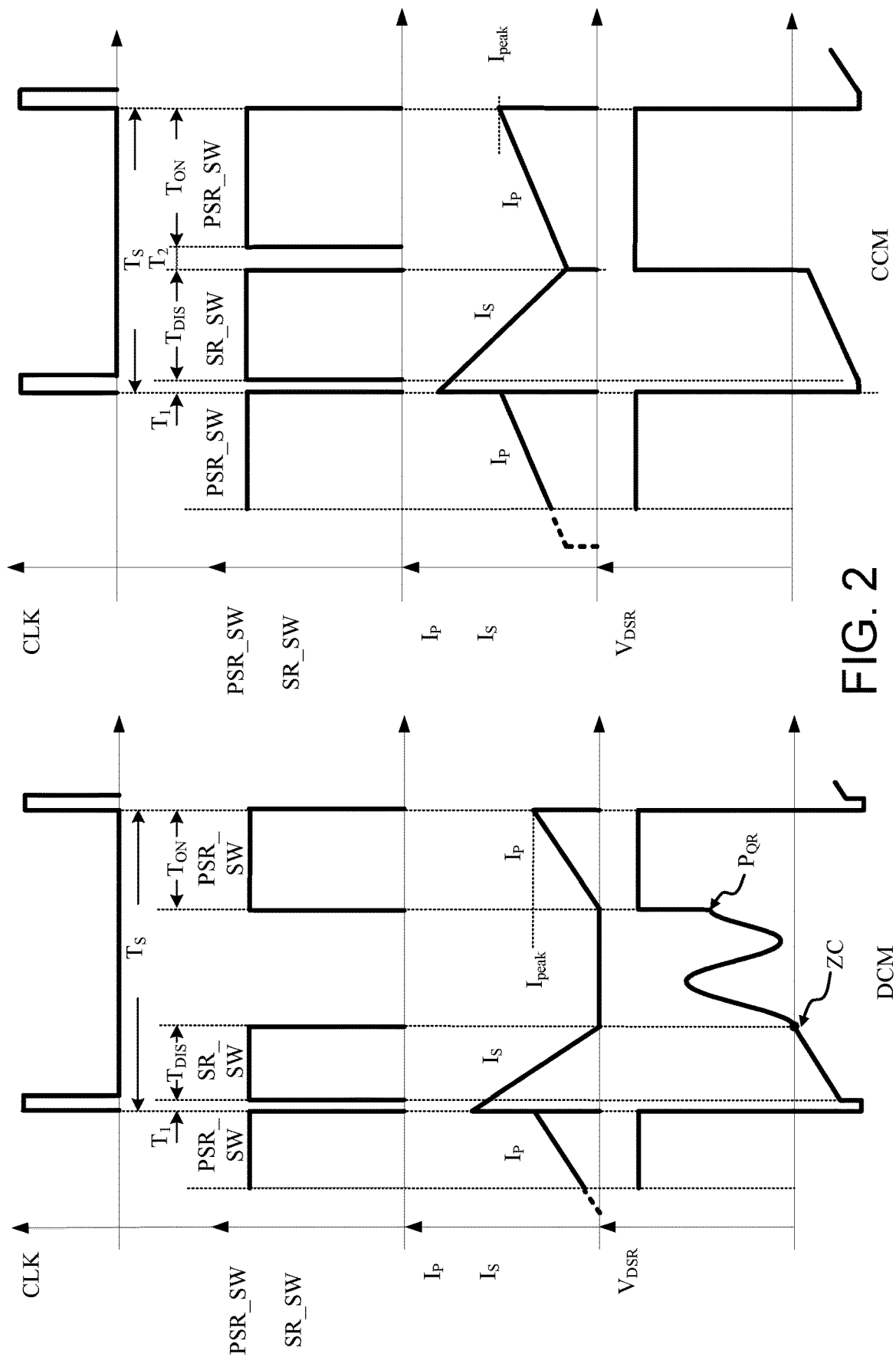
FIG. 2 shows the waveforms of the clock signal CLK, primary side switching signal PSR_SW, secondary side switching signal SR_SW, primary side current $I_P$, secondary side current $I_S$, and secondary side transformer signal $V_{DSR}$ in DCM (Discontinuous Current Mode) and CCM (Continuous Current Mode) in accordance with the present invention.

As shown in FIG. 2, the secondary side controller 70 controls the primary side controller 30 to disable the primary side switching signal PSR_SW (turn off the primary side switch 20), and then enables the secondary side switching signal SR_SW (turns on the switch 51 of the synchronous rectifier 50) after the primary side switching signal PSR_SW is disabled. Further, the secondary side controller 70 disables the secondary side switching signal SR_SW, and controls the primary side controller 30 to enable the primary side switching signal PSR_SW after the secondary side switching signal SR_SW is disabled. Accordingly, the primary side switching signal PSR_SW is disabled before the secondary side switching signal SR_SW is enabled, and the secondary side switching signal SR_SW is disabled before the primary side switching signal PSR_SW is enabled. The control circuit is much easier to monitor and control the system load with secondary side control.

FIG. 2 shows the waveforms of the clock signal CLK, primary side switching signal PSR_SW, secondary side switching signal SR_SW, primary side current $I_P$, secondary side current $I_S$, and secondary side transformer signal $V_{DSR}$ in DCM (Discontinuous Current Mode) and CCM (Continuous Current Mode) in accordance with the present invention.

Figure 3:
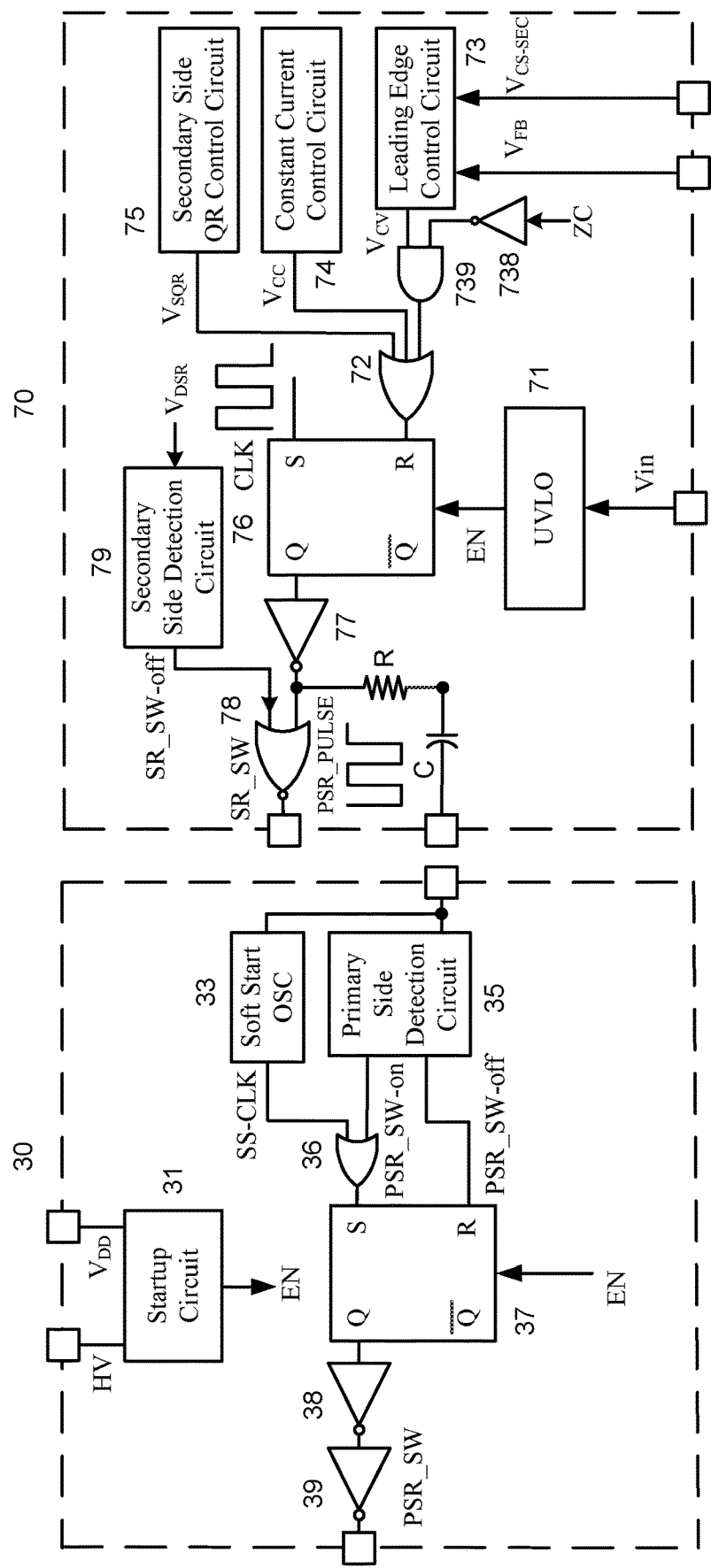
FIG. 3 is a circuit diagram of an embodiment of the control circuit in accordance with the present invention.

FIG. 3 is a circuit diagram of an embodiment of the control circuit in accordance with the present invention. As shown in FIG. 3, the primary side controller 30 comprises a startup circuit 31, a soft start oscillator 33, a primary side detection circuit 35, an OR gate 36, and a primary side signal generation circuit. The primary side signal generation circuit comprises a flip-flop 37 and a driver including inverters 38 and 39. The startup circuit 31 is coupled to receive the high voltage HV and the supply voltage $V_{DD}$ and generate a system enable signal EN for enabling the flip-flop 37. The soft start oscillator 33 is coupled to the first input terminal of the OR gate 36. The output terminal of the OR gate 36 is coupled to the set terminal S of the flip-flop 37. The output terminal Q of the flip-flop 37 is coupled to the driver for generating the primary side switching signal PSR_SW. The output terminal Q of the flip-flop 37 is coupled to the input terminal of the inverter 38, and the output terminal of the inverter 38 is coupled to the input terminal of the inverter 39. The output terminal of the inverter 39 outputs the primary side switching signal PSR_SW. The primary side detection circuit 35 receives the primary side control signal (pulse signal PSR_PULSE) to detect the primary side control signal for generating a primary side turning-on signal PSR_SW-on or a primary side turning-off signal PSR_SW-off. The primary side detection circuit 35 is coupled to the second input terminal of the OR gate 36 and the reset terminal R of the flip-flop 37.

The soft start oscillator 33 generates a soft-start clock signal SS-CLK to set the flip-flop 37 via the OR gate 36 for generating the primary side switching signal PSR_SW and soft starting the power converter. Once the secondary side of the transformer 10 generates the output voltage $V_{out}$ and the input signal $V_{in}$ is higher than a under-voltage lockout (UVLO) threshold, the secondary side controller 70 starts to operate. The secondary side controller 70 generates the primary side control signal (pulse signal PSR_PULSE) to control the primary side controller 30 for controlling the enabling of the leading edge of the primary side switching signal PSR_SW and regulating the output voltage $V_{out}$.

The soft start oscillator 33 stops generating the soft-start clock signal SS-CLK when the primary side control signal (pulse signal PSR_PULSE) is sent to the primary side controller 30 via the signal-transfer device 90 (as shown in FIG. 1) and the soft start oscillator 33 receives the primary side control signal. The primary side detection circuit 35 of the primary side controller 30 is coupled to detect the pulse signal PSR_PULSE for enabling or disabling the primary side switching signal PSR_SW. Once the level of the pulse signal PSR_PULSE is higher than the enabling threshold PSR_SW-on_Vth, the primary side detection circuit 35 generates the primary side turning-on signal PSR_SW-on to set the flip-flop 37 via the OR gate 36 for enabling the primary side switching signal PSR_SW. Once the level of the pulse signal PSR_PULSE is lower than the disabling threshold PSR_SW-off_Vth, the primary side detection circuit 35 generates the primary side turning-off signal PSR_SW-off to reset the flip-flop 37 for disabling the primary side switching signal PSR_SW.

The secondary side controller 70 comprises an under-voltage lockout (UVLO) circuit 71, a secondary side signal generation circuit, a leading edge control circuit 73, a constant current control circuit 74, a secondary side QR (quasi-resonant) control circuit 75, and a secondary side detection circuit 79. The secondary side signal generation circuit comprises an OR gate 72, a flip-flop 76, an inverter 77, a NOR gate 78, an inverter 738, and an AND gate 739 for generating the secondary side switching signal SR_SW and the pulse signal PSR_PULSE (primary side control signal).

A clock signal CLK is supplied to the set terminal S of the flip-flop 76 to set the flip-flop 76 for enabling the secondary side switching signal SR_SW. The output terminal Q of the flip-flop 76 is coupled to the input terminal of the inverter 77. The output terminal of the inverter 77 outputs the pulse signal PSR_PULSE in response to the output signal of the flip-flop 76. A resistor R and a capacitor C are coupled each other in series and coupled between the output terminal of the inverter 77 and the signal-transfer device 90 shown in FIG. 1. Therefore, the pulse signal PSR_PULSE is sent to the signal-transfer device 90 through the resistor R and the capacitor C.

The secondary side detection circuit 79 detects the secondary side transformer signal $V_{DSR}$ and generates a secondary side turning-off signal SR_SW-off. Once the level of the secondary side transformer signal $V_{DSR}$ is equal to or higher than a threshold, for example zero, the secondary side detection circuit 79 generates the secondary side turning-off signal SR_SW-off which is enabled. On the contrary, the secondary side turning-off signal SR_SW-off is disabled when the level of the secondary side transformer signal $V_{DSR}$ is lower than the threshold. The secondary side turning-off signal SR_SW-off is coupled to the first input terminal of the NOR gate 78. The output terminal of the inverter 77 is further coupled to the second input terminal of the NOR gate 78. The output terminal of the NOR gate 78 outputs the secondary side switching signal SR_SW in response to the output signal of the flip-flop 76 and the secondary side turning-off signal SR_SW-off.

As shown in FIG. 2, once the primary side switching signal PSR_SW is enabled or the secondary side current $I_S$ is reduced to zero (the power converter operates in DCM mode), the level of the secondary side transformer signal $V_{DSR}$ will be higher than or equal to the threshold. Therefore, the secondary side turning-off signal SR_SW-off (as shown in FIG. 3) is enabled for insuring that the secondary side switching signal SR_SW is disabled when the primary side switching signal PSR_SW is enabled or the secondary side current $I_S$ is reduced to zero. On the contrary, the secondary side switching signal SR_SW is enabled after the primary side switching signal PSR_SW is disabled. As shown in FIG. 2, the delay time $T_1$ is between the disabling of the primary side switching signal PSR_SW and the enabling of the secondary side switching signal SR_SW, and therefore there is no shoot through.

The leading edge control circuit 73 receives the feedback signal $V_{FB}$ and the secondary side current-sense signal $V_{CS\text{-}SEC}$ for generating a first control signal $V_{CV}$. The first control signal $V_{CV}$ is coupled to the first input terminal of the OR gate 72 via the AND gate 739. The leading edge control circuit 73 is for constant voltage control with current mode according to one embodiment of the present invention, and therefore the first control signal $V_{CV}$ is the constant voltage control signal. The output terminal of the OR gate 72 is coupled to the reset terminal R of the flip-flop 76 for resetting the flip-flop 76. A zero current signal ZC is coupled to the second input terminal of the AND gate 739 via the inverter 738 for disabling the output signal of the AND gate 739. That is, the first control signal $V_{CV}$ is disabled when the zero current signal ZC is enabled. The enabling of the zero current signal ZC indicates that the secondary side current $I_S$ is reduced to zero, and therefore the power converter operates in DCM mode.

The constant current control circuit 74 generates a third control signal $V_{CC}$ coupled to the second input terminal of the OR gate 72. The constant current control circuit 74 is for constant current control, and therefore the third control signal $V_{CC}$ is a constant current control signal. The constant current control in secondary side can improve transient response without external compensation component. The secondary side QR control circuit 75 generates a second control signal $V_{SQR}$ coupled to the third input terminal of the OR gate 72. The second control signal $V_{SQR}$ is the secondary side QR signal. The secondary side QR control circuit 75 controls the power converter to perform the QR (quasi-resonant) mode when the power converter operates in DCM mode (Discontinuous Current Mode). Once the power converter performs the QR mode, there is no error trigger of the synchronous rectifier 50 according to the present invention.

The under-voltage lockout circuit 71 is coupled to detect the input signal $V_{in}$. Once the input signal $V_{in}$ is higher than a under-voltage lockout threshold, the under-voltage lockout circuit 71 generates an enable signal EN for enabling the flip-flop 76. The leading edge control circuit 73 generates the first control signal $V_{CV}$ to reset the flip-flop 76 in response to the feedback signal $V_{FB}$ and the secondary side current-sense signal $V_{CS\text{-}SEC}$ for disabling the secondary side switching signal SR_SW (turning off the switch 51 of the synchronous rectifier 50 shown in FIG. 1) and enabling the pulse signal PSR_PULSE (enabling the primary side switching signal PSR_SW for turning on the primary side switch 20 shown in FIG. 1).

Further, the constant current control circuit 74 and the secondary side QR control circuit 75 are also utilized to reset the flip-flop 76 for disabling the secondary side switching signal SR_SW and enabling the primary side switching signal PSR_SW. The flip-flop 76 is set by the leading edge of the clock signal CLK to enable the secondary side switching signal SR_SW and disable the primary side switching signal PSR_SW. The frequency of the clock signal CLK is fixed according to one embodiment of the present invention. Therefore, the frequencies of the secondary side switching signal SR_SW and the primary side switching signal PSR_SW are fixed.

The secondary side controlled synchronous rectifier could operate in CCM, DCM and QR mode without limitation. When the power converter is started, the primary side controller 30 initiates the soft start oscillator 33 to soft start the power converter for making the output voltage $V_{out}$ ramp up. After the input signal $V_{in}$ is higher than the under-voltage lockout threshold, the secondary side controller 70 sends the primary side control signal (pulse signal PSR_PULSE) to the primary side controller 30 through the signal-transfer device 90 to disable the soft start oscillator 33. Then the secondary side controller 70 continues the soft start and regulating the output voltage $V_{out}$.

As shown in FIG. 2, after the clock signal CLK is set, the secondary side switching signal SR_SW is enabled for turning on the switch 51 of the synchronous rectifier 50 (as shown in FIG. 1), then the leading edge control circuit 73 of the secondary side controller 70 controls the start time of the enabling of the primary side switching signal PSR_SW for controlling the turn on point of the primary side switch 20. The leading edge controlled of the primary side switching signal PSR_SW in secondary side can improve transient response for higher converter bandwidth. The secondary side QR control circuit 75 of the secondary side controller 70 also controls the turn on point of the primary side switch 20 when the power converter operates in DCM mode.

Further, the secondary side switching signal SR_SW is disabled before the primary side switching signal PSR_SW is enabled. When the power converter operates in CCM, the delay time $T_2$ is between the disabling of the secondary side switching signal SR_SW and the enabling of the primary side switching signal PSR_SW due to the time delay of the driver (inverters 38 and 39) of the primary side controller 30. Thus, there is no shoot through.

The control circuit according to the present invention is applied to varied power converter, such as flyback power converter and forward power converter. According to another embodiment of the present invention, the secondary side controller 70 doesn't have the OR gate 72, the constant current control circuit 74, the secondary side QR control circuit 75, the inverter 738, and the AND gate 739.

Figure 4:
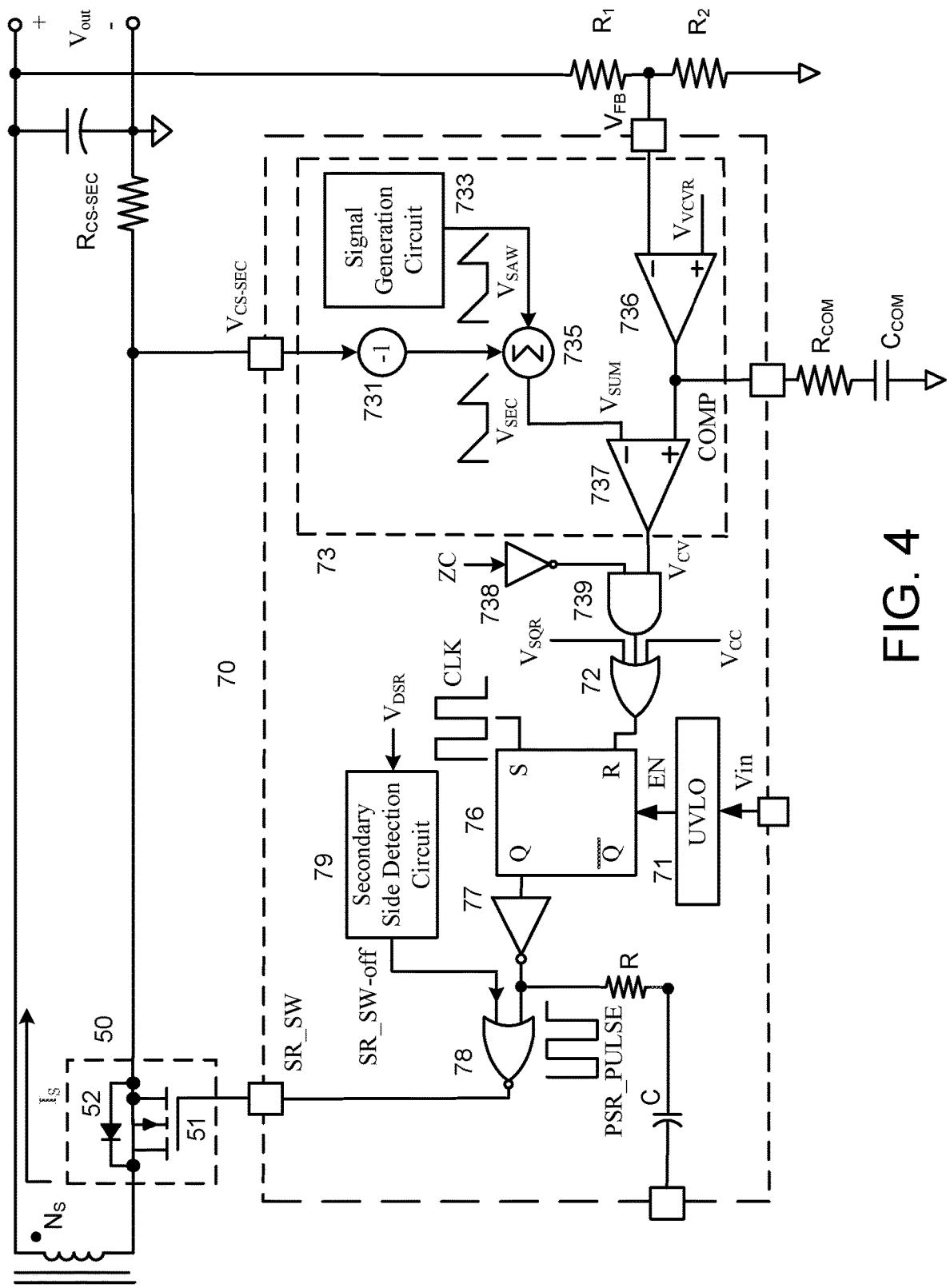
FIG. 4 is a circuit diagram of an embodiment of the leading edge control circuit in accordance with the present invention.

FIG. 4 is a circuit diagram of an embodiment of the leading edge control circuit in accordance with the present invention. The leading edge control circuit 73 comprises a signal processing circuit 731, a signal generation circuit 733, an operation unit 735, an error amplifier 736, and a comparator 737. The signal processing circuit 731 reverses the secondary side current-sense signal $V_{CS-SEC}$ to generate a secondary side sense signal $V_{SEC}$ which is determined by the current-sense device $R_{CS-SEC}$ and the secondary side current $I_S$. The waveform of the secondary side sense signal $V_{SEC}$ is shown in FIG. 5.

Figure 5:
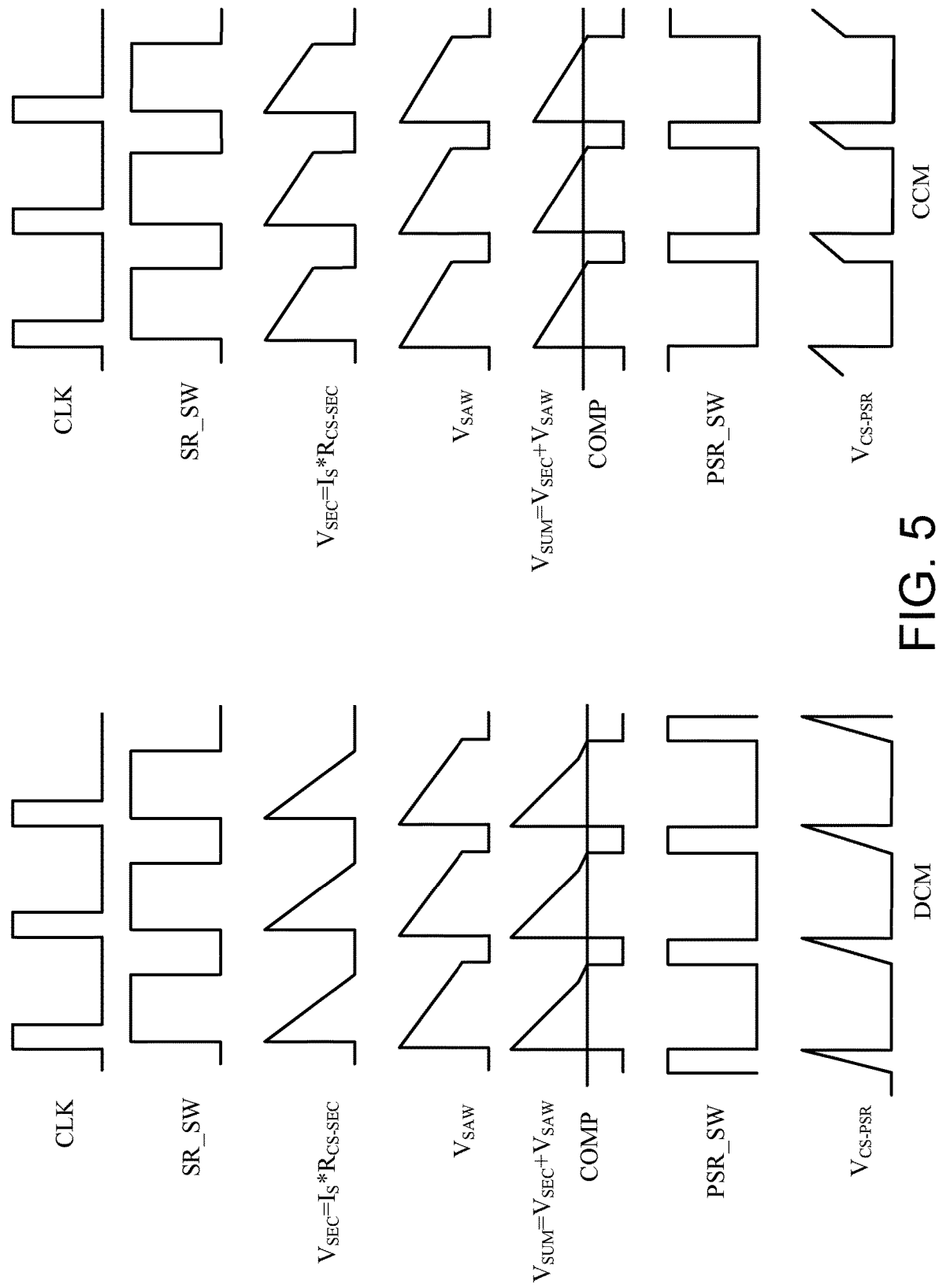
FIG. 5 shows the waveforms of the clock signal CLK, secondary side switching signal SR_SW, secondary side sense signal $V_{SEC}$, sawtooth signal $V_{SAW}$, operation signal $V_{SUM}$, signal COMP, primary side switching signal PSR_SW, and primary side current-sense signal $V_{CS\text{-}PSR}$ in DCM and CCM in accordance with the present invention.

The signal generation circuit 733 generates a compensation signal which is a sawtooth signal $V_{SAW}$ shown in FIG. 5 according to one embodiment of the present invention. The operation unit 735 is coupled to the output terminals of the signal processing circuit 731 and the signal generation circuit 733 to receive the secondary side sense signal $V_{SEC}$ and the sawtooth signal $V_{SAW}$. The operation unit 735 generates an operation signal $V_{sum}$ in response to the secondary side sense signal $V_{SEC}$ and the sawtooth signal $V_{SAW}$. The operation unit 735 adds up the secondary side sense signal $V_{SEC}$ and the sawtooth signal $V_{SAW}$ to generate the operation signal $V_{SUM}$ according to one embodiment of the present invention. Therefore, the operation unit 735 can be implemented by the adder.

The feedback signal $V_{FB}$ is coupled to the negative input terminal of the error amplifier 736, and a reference signal $V_{VCVR}$ is supplied to the positive input terminal of the error amplifier 736. The error amplifier 736 is used to generate a signal COMP in response to the feedback signal $V_{FB}$ and the reference signal $V_{VCVR}$. A resistor $R_{COM}$ is coupled to a capacitor $C_{COM}$ in series, and coupled to the output terminal of the error amplifier 736 for generating the signal COMP. The operation signal $V_{SUM}$ and the signal COMP are coupled to the negative input terminal and the positive input terminal of the comparator 737, respectively. The comparator 737 compares the operation signal $V_{SUM}$ with the signal COMP for generating the first control signal $V_{CV}$. The signal COMP acts as a control voltage for constant voltage control. The output terminal of the comparator 737 is coupled to the first input terminal of the AND gate 739.

The first control signal $V_{CV}$ is enabled to reset the flip-flop 76 for disabling the secondary side switching signal SR_SW and enabling the pulse signal PSR_PULSE (enabling the primary side switching signal PSR_SW shown in FIG. 1) when the signal COMP is equal to or higher than the operation signal $V_{SUM}$ and the power converter operates in CCM mode. The enabling of the zero current signal ZC indicates that the power converter operates in DCM mode. Therefore, the first control signal $V_{CV}$ is disabled and the second control signal $V_{SQR}$ generated by the secondary side QR control circuit 75 (as shown in FIG. 3) will reset the flip-flop 76 to enable the primary side switching signal PSR_SW for perform QR mode when the zero current signal ZC is enabled.

FIG. 5 shows the waveforms of the clock signal CLK, secondary side switching signal SR_SW, secondary side sense signal $V_{SEC}$, sawtooth signal $V_{SAW}$, operation signal $V_{SUM}$, primary side switching signal PSR_SW, and primary side current-sense signal $V_{CS-PSR}$ in DCM and CCM in accordance with the present invention.

Figure 6:
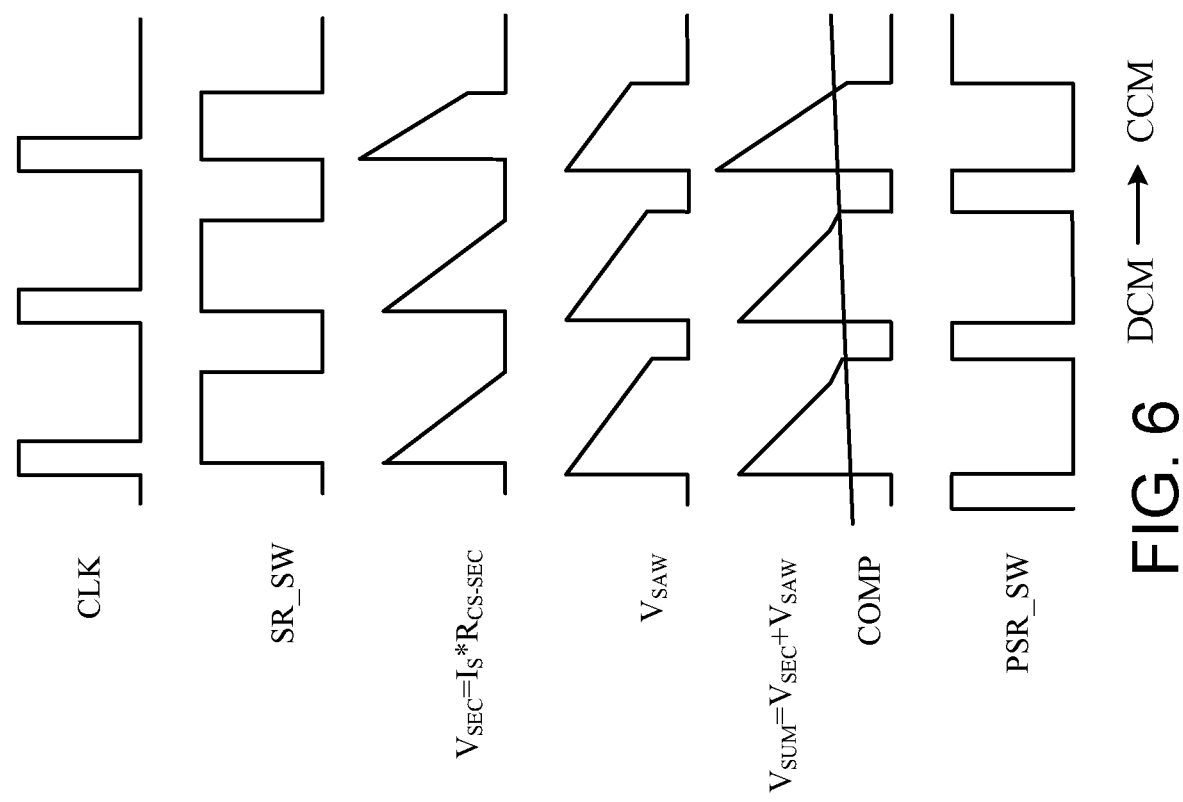
FIG. 6 shows the waveforms of the clock signal CLK, secondary side switching signal SR_SW, secondary side sense signal $V_{SEC}$, sawtooth signal $V_{SAW}$, operation signal $V_{SUM}$, signal COMP, and primary side switching signal PSR_SW when the load is changed from light load to heavy load in accordance with the present invention.

FIG. 6 shows the waveforms of the clock signal CLK, secondary side switching signal SR_SW, secondary side sense signal $V_{SEC}$, sawtooth signal $V_{SAW}$, operation signal $V_{SUM}$, signal COMP, and the primary side switching signal PSR_SW when the load is changed from light load to heavy load in accordance with the present invention. As shown in FIG. 6, once the load is changed from light load to heavy load, the signal COMP is increased and therefore the duty (on-time) of the primary side switching signal PSR_SW is increased. That is, the operation mode of the power converter is changed from DCM to CCM mode. Therefore, the power converter operates in CCM when the load is heavy load, and the power converter operates in DCM and performs the QR mode when the load is light load for optimizing the efficiency.

Figure 7:
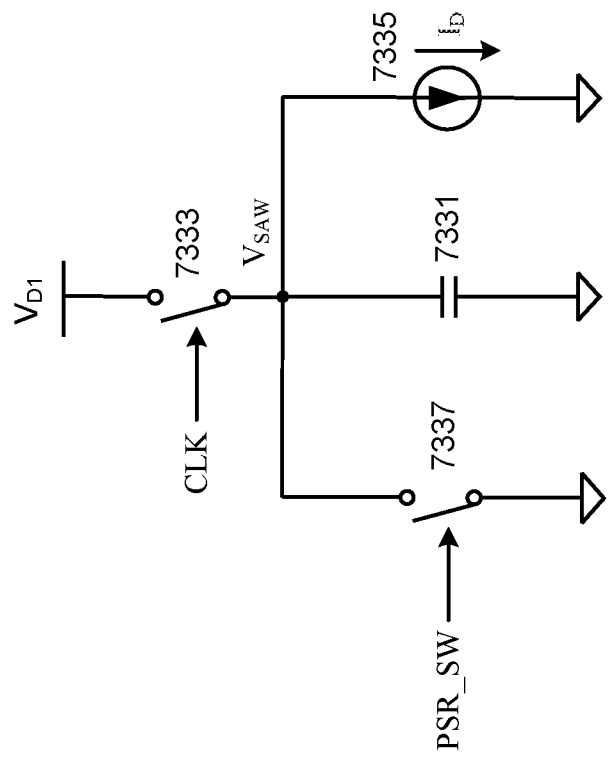
FIG. 7 is a circuit diagram of an embodiment of the signal generation circuit in accordance with the present invention.

FIG. 7 is a circuit diagram of an embodiment of the signal generation circuit in accordance with the present invention. As shown in FIG. 7, the signal generation circuit 733 comprises a capacitor 7331, a switch 7333, a discharge current source 7335, and a switch 7337. The switch 7333 is coupled between the voltage $V_{D1}$ and the capacitor 7331. The discharge current source 7335 and the switch 7337 are coupled to the capacitor 7331 in parallel. The voltage $V_{D1}$ charges the capacitor 7331 through the switch 7333. The switch 7333 is controlled by the clock signal CLK. The discharge current source 7335 generates a discharge current $I_D$ to discharge the capacitor 7331, and therefore the level of the voltage crossing the capacitor 7331 is reduced with a slope determined by the discharge current $I_D$. Thus, the sawtooth signal $V_{SAW}$ is generated when the clock signal CLK is enabled. The switch 7337 is controlled by the primary side switching signal PSR_SW to clear the sawtooth signal $V_{SAW}$.

Figure 8:
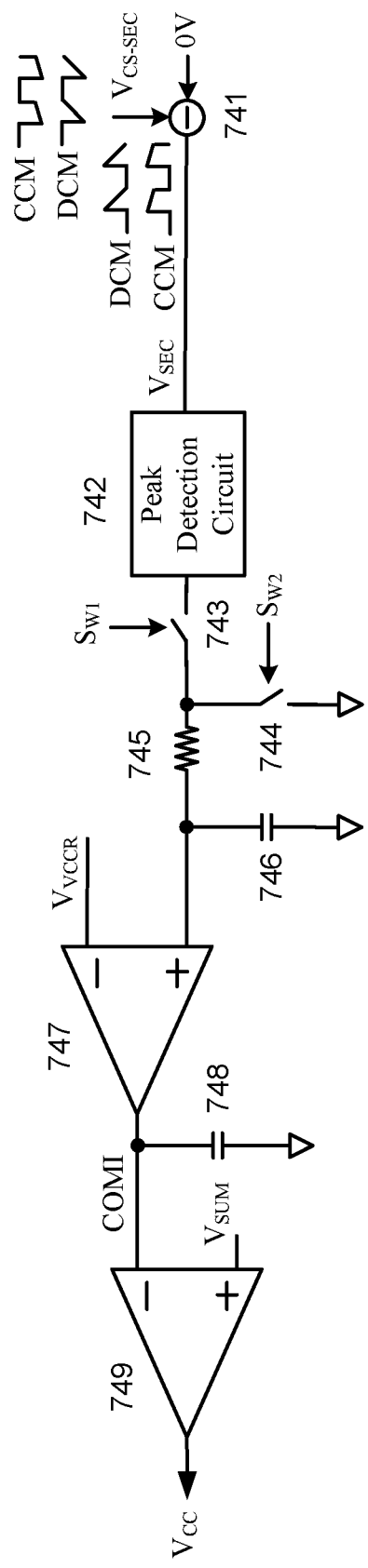
FIG. 8 is a circuit diagram of an embodiment of the constant current control circuit in accordance with the present invention.

FIG. 8 is a circuit diagram of an embodiment of the constant current control circuit in accordance with the present invention. As shown in FIG. 8, the constant current control circuit comprises an operation unit 741, a peak detection circuit 742, switches 743, 744, a resistor 745, a capacitor 746, an error amplifier 747, a capacitor 748, and a comparator 749. The constant current control circuit 74 is utilized to generate the third control signal $V_{CC}$ in response to the secondary side current-sense signal $V_{CS\text{-}SEC}$ to control the primary side switching signal PSR_SW for constant current control.

The operation unit 741 receives the secondary side current-sense signal $V_{CS\text{-}SEC}$ and a zero voltage. The operation unit 741 generates the secondary side sense signal $V_{SEC}$ in response to the secondary side current-sense signal $V_{CS\text{-}SEC}$ and the zero voltage. The operation unit 741 generates the secondary side sense signal $V_{SEC}$ by subtracting the level of the secondary side current-sense signal $V_{CS\text{-}SEC}$ from the zero voltage. The operation unit 741 is operated as the signal processing circuit which reverses the secondary side current-sense signal $V_{CS\text{-}SEC}$ to generate the secondary side sense signal $V_{SEC}$.

The peak detection circuit 742 is coupled to the output terminal of the operation unit 741 to receive the secondary side sense signal $V_{SEC}$ for detecting the peak of the secondary side sense signal $V_{SEC}$. The switch 743 is coupled between the output terminal of the peak detection circuit 742 and the first terminal of the resistor 745. The switch 743 is controlled by a switching signal $S_{W1}$. The capacitor 746 is coupled between the second terminal of the resistor 745 and the ground. The switch 744 is coupled between the first terminal of the resistor 745 and the ground. The switch 744 is controlled by a switching signal $S_{W2}$. A reference signal $V_{VCCR}$ is supplied to the negative input terminal of the error amplifier 747, and the positive input terminal of the error amplifier 747 is coupled to the capacitor 746. The capacitor 748 is coupled between the output terminal of the error amplifier 747 and the ground. A signal COMI is generated at the capacitor 748, and coupled to the negative input terminal of the comparator 749. The operation signal $V_{SUM}$ is supplied to the positive input terminal of the comparator 749. The output terminal of the comparator 749 outputs the third control signal $V_{CC}$.

Figure 9:
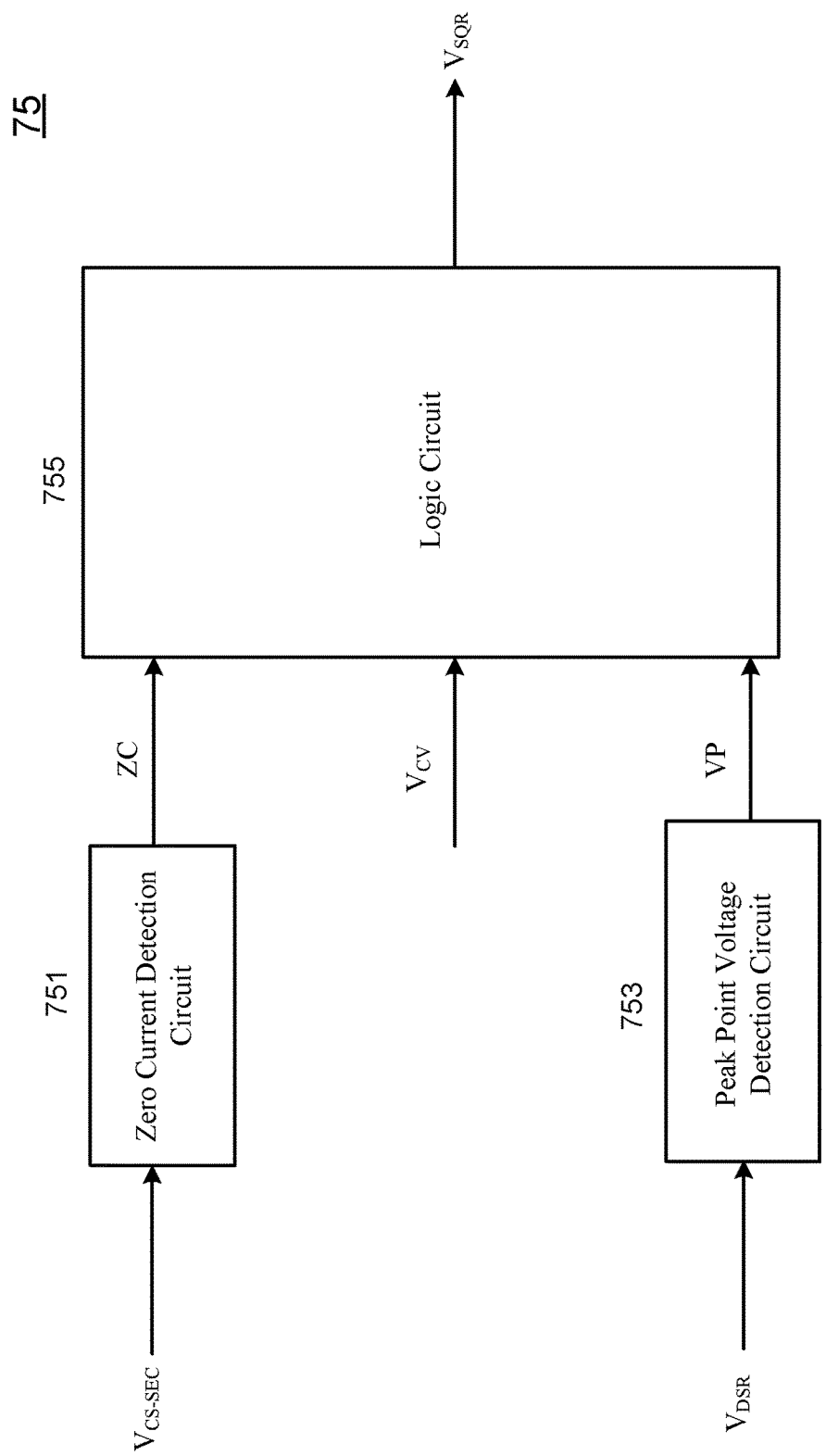
FIG. 9 is a block diagram of an embodiment of the secondary side QR control circuit in accordance with the present invention.

FIG. 9 is a block diagram of an embodiment of the secondary side QR control circuit in accordance with the present invention. As shown in FIG. 9, the secondary side QR control circuit 75 comprises a zero current detection circuit 751, a peak point voltage detection circuit 753, and a logic circuit 755. The zero current detection circuit 751 is coupled to receive the secondary side current-sense signal $V_{CS\text{-}SEC}$ for detecting the secondary side current-sense signal $V_{CS\text{-}SEC}$. The zero current detection circuit 751 is used to detect the occurrence of the zero current of the secondary side current $I_S$ (as shown in FIG. 2) by detecting the secondary side current-sense signal $V_{CS\text{-}SEC}$. Once the zero current of the secondary side current $I_S$ is occurred, that represents the power converter operates in DCM, the zero current detection circuit 751 generates the zero current signal ZC which is enabled (as shown in FIGS. 2 and 3).

The peak point voltage detection circuit 753 is coupled to receive the secondary side transformer signal $V_{DSR}$ (as shown in FIG. 1) for detecting the peak point voltage of the secondary side transformer signal $V_{DSR}$. Once the peak point voltage (point $P_{QR}$ shown in FIG. 2) is detected, the peak point voltage detection circuit 753 generates a peak point signal VP which is enabled. The zero current signal ZC, peak point signal VP, and the first control signal $V_{CV}$ generated by the leading edge control circuit 73 (as shown in FIG. 4) are coupled to the input terminals of the logic circuit 755. The logic circuit 755 generates the second control signal $V_{SQR}$ to enable the pulse signal PSR_PULSE (enable the primary side switching signal PSR_SW shown in FIGS. 2 and 3) for turning on the primary side switch 20 (as shown in FIG. 1) when the zero current signal ZC, the first control signal $V_{CV}$, and the peak point signal VP are enabled. That is, the secondary side QR control circuit 75 controls the power converter to perform the QR mode when the power converter operates in DCM mode.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A secondary side controlled control circuit for a power converter that forms an output voltage and an output current from an input voltage, comprising:
   a primary side controller, configured to generate a primary side switching signal for switching a primary side switch of the power converter, the primary side switch configured to form a primary side current through a primary winding of a transformer having a secondary winding;
   a secondary side controller, configured to generate a secondary side switching signal for turning-on a switch of a synchronous rectifier of the power converter, the secondary side controller configured to, as long as the input voltage is greater than an under-voltage lockout value, turn-on the switch at a frequency that is independent of a value of the output voltage and independent of a value of the output current and independent of a change in a voltage from the secondary winding wherein the secondary side controller generates a primary side control signal to control the primary side controller for controlling the primary side switching signal; and
   the secondary side controller configured to receive a feedback signal that is representative of the output voltage and to receive a current-sense signal that is representative of the output current, the secondary side controller configured to turn-off the switch in response to both a value of the output voltage and a value of the output current.

2. The secondary side controlled control circuit as claimed in claim 1, wherein the secondary side controller generates the primary side control signal to control the primary side controller for controlling a start time of a leading edge of the primary side switching signal.

3. The secondary side controlled control circuit as claimed in claim 1, wherein the primary side switching signal is disabled before the secondary side switching signal is enabled, and the secondary side switching signal is disabled before the primary side switching signal is enabled.

4. The secondary side controlled control circuit as claimed in claim 1, wherein the secondary side controller further controls the secondary side switching signal and the primary side control signal in response to the feedback signal and the secondary side current-sense signal.

5. The secondary side controlled control circuit as claimed in claim 4, wherein the secondary side controller disables the secondary side switching signal and enables the primary side control signal in response to the feedback signal and the secondary side current-sense signal.

6. The secondary side controlled control circuit as claimed in claim 5, wherein the secondary side controller comprises:
 a leading edge control circuit, configured to generate a control signal in response to the feedback signal and the secondary side current-sense signal; and
 a secondary side signal generation circuit, configured to generate the secondary side switching signal, configured to disable the secondary side switching signal in response to the control signal of the leading edge control circuit, and configured to generate the primary side control signal in response to the control signal of the leading-edge control circuit for enabling the primary side switching signal.

7. The secondary side controlled control circuit as claimed in claim 1, wherein the secondary side controller enables the primary side control signal in response to the feedback signal, the current-sense signal, and a secondary side transformer signal.

8. A secondary side controlled control circuit for a power converter that forms an output voltage and an output current, comprising:
 a primary side controller, configured to generate a primary side switching signal for switching a primary side switch of the power converter; and
 a secondary side controller, configured to generate a secondary side switching signal for switching a switch of a synchronous rectifier of the power converter, the secondary side controller configured to turn-on the switch independently of a value of the output voltage, wherein the secondary side controller generates a primary side control signal to control the primary side controller for controlling the primary side switching signal, and wherein the secondary side controller enables the primary side control signal in response to a feedback signal, a secondary side current-sense signal, and a secondary side transformer signal, the secondary side controller including:
 a leading edge control circuit, configured to generate a first control signal in response to the feedback signal and the secondary side current-sense signal;
 a zero current detection circuit, configured to detect the secondary side current-sense signal and configured to generate a zero current signal;
 a peak point voltage detection circuit, configured to detect the secondary side transformer signal and generating a peak point signal; a logic circuit, configured to generate a second control signal in response to the first control signal, the zero current signal, and the peak point signal; and
 a secondary side signal generation circuit, configured to generate the primary side control signal in response to the second control signal of the logic circuit, and configured to generate the secondary side switching signal.

9. The secondary side controlled control circuit as claimed in claim 1, wherein the secondary side controller controls the secondary side switching signal and the primary side control signal in response to the current-sense signal.

10. The secondary side controlled control circuit as claimed in claim 9, wherein the secondary side controller disables the secondary side switching signal and enables the primary side control signal in response to the current-sense signal.

11. The secondary side controlled control circuit as claimed in claim 10, wherein the secondary side controller comprises:
 a constant current control circuit, configured to generate a control signal in response to the secondary side current-sense signal; and
 a secondary side signal generation circuit, configured to generate the secondary side switching signal; disabling the secondary side switching signal in response to the control signal of the constant current control circuit and configured to generate the primary side control signal in response to the control signal of the constant current control circuit for enabling the primary side switching signal.

12. The secondary side controlled control circuit as claimed in claim 1, wherein the secondary side controller forms the frequency as a clock signal having a substantially fixed frequency.

13. The secondary side controlled control circuit as claimed in claim 1, wherein the secondary side controller detects a secondary side transformer signal for disabling the secondary side switching signal.

14. The secondary side controlled control circuit as claimed in claim 13, wherein the secondary side controller comprises:
 a secondary side detection circuit, configured to detect the secondary side transformer signal and generating a secondary side turning-off signal; and
 a secondary side signal generation circuit, configured to generate the secondary side switching signal, and configured to disable the secondary side switching signal in response to the secondary side turning-off signal.

15. The secondary side controlled control circuit as claimed in claim 1, wherein the primary side controller detects the primary side control signal for controlling the primary side switching signal.

16. The secondary side controlled control circuit as claimed in claim 15, wherein the primary side controller comprises:
 a primary side detection circuit, configured to detect the primary side control signal and configured to generate a primary side turning-on signal or a primary side turning-off signal; and
 a primary side signal generation circuit, configured to control the primary side switching signal in response to the primary side turning-on signal or the primary side turning-off signal.

17. The secondary side controlled control circuit as claimed in claim 1, wherein the secondary side controller transfers the primary side control signal to the primary side controller via a signal-transfer device.

18. The secondary side controlled control circuit of claim 1 wherein the secondary side controller includes an oscillator that forms a free running clock signal, the secondary side controller configured to turn-on the switch of the synchronous rectifier in response to the free running clock signal.

19. A method of configuring a secondary side controlled circuit for a power converter that forms an output voltage and an output current comprising: configuring a secondary side controller to generate a secondary side switching signal for switching a switch of a synchronous rectifier of the power converter, and configuring the secondary side controller to form a primary side control signal to control a primary side controller for controlling a primary side switching signal for switching a primary side switch of the power converter; and configuring an oscillator in the secondary side controller to form a clock signal at a substantially fixed frequency, including configuring the secondary side controller to form a primary signal at the substantially fixed frequency to disable the primary side switch responsively to the clock signal, and configuring the secondary side controller to turn-on the switch at the substantially fixed frequency responsively to both the clock signal and forming the primary signal to disable the primary side switch.

20. The method of claim 19 including configuring the primary side controller to include another oscillator and to form the primary side switching signal independently of the clock signal in response to the output voltage being less than an under-voltage threshold value.

* * * * *